United States Patent [19]

Fally

[11] Patent Number: 5,739,524
[45] Date of Patent: Apr. 14, 1998

[54] DYNAMIC DISTANCE AND POSITION SENSOR AND METHOD OF MEASURING THE DISTANCE AND THE POSITION OF A SURFACE USING A SENSOR OF THIS KIND

[75] Inventor: Jacques Fally, Orsay, France

[73] Assignee: European Gas Turbines SA, Paris, France

[21] Appl. No.: 501,306

[22] Filed: Jul. 12, 1995

[30] Foreign Application Priority Data

Jul. 13, 1994 [FR] France .................. 94 08725

[51] Int. Cl.$^6$ ............................................. G01B 11/14
[52] U.S. Cl. ................... 250/227.11; 250/559.29; 356/376
[58] Field of Search .............. 250/227.11, 359.29, 250/559.38, 231.1, 231.11; 73/705; 356/375, 376

[56] References Cited

U.S. PATENT DOCUMENTS

| | | |
|---|---|---|
| 4,701,610 | 10/1987 | Hoogenboom . |
| 4,739,161 | 4/1988 | Moriyama et al. ............... 250/227.11 |
| 5,473,156 | 12/1995 | Pinnock et al. ............... 250/227.11 |

FOREIGN PATENT DOCUMENTS

| | | |
|---|---|---|
| 0263016A1 | 4/1988 | European Pat. Off. . |
| 3619923A1 | 1/1987 | Germany . |
| 4201890A1 | 7/1993 | Germany . |

*Primary Examiner*—Stephone B. Allen
*Attorney, Agent, or Firm*—Sughrue, Mion, Zinn, Macpeak & Seas, PLLC

[57] ABSTRACT

The invention concerns a dynamic sensor for sensing the distance and the position of a surface moving past said sensor, including:

a send optical channel (3) emitting radiation (4) towards the surface (1) and two receive optical channels (5, 6) each receiving a portion (4A, 4B) of the radiation (4) reflected or diffusely reflected by said surface (1);

a radiation emitter (2) coupled to the other end of the send optical channel (3);

an opto-electronic converter (7, 8) coupled to the other end of each of the two receive optical channels (5, 6);

a processor device (9) connected to the opto-electronic converters (7, 8);

in accordance with the invention:

the send optical channel (3) and the receive optical channels (5, 6) respectively have a send axis (3A) and receive axes (5A, 6A) that are parallel to each other; the ends of the optical channels (3, 5, 6) facing the surface (1) are in a common plane perpendicular to the axes (3A, 5A, 6A) of the optical channels (3, 5, 6), each of said ends constituting the vertex of a triangle in said plane, one side of the triangle running from the end of the send optical channel (3) having a length different than the length of the other side running from the end of the send optical channel (3).

15 Claims, 4 Drawing Sheets

DYNAMIC DISTANCE AND POSITION SENSOR AND METHOD OF MEASURING THE DISTANCE AND THE POSITION OF A SURFACE USING A SENSOR OF THIS KIND

The present invention concerns distance and position measuring devices and methods in general and in particular a dynamic distance and position sensor and various uses of a sensor of this kind, as well as a method of measuring the distance and the position of a surface to be scanned.

The document "LASER PROXIMITY PROBES FOR THE MEASUREMENT OF TURBINE BLADE TIP RUNNING CLEARANCES" by W. Drinkuth et al, 1974, ISA ASI 74228 (133–140) discloses an optical measuring device using triangulation.

The major drawback of this prior art measuring device is the large size of the measuring head. The document "THEORETICAL AND EXPERIMENTAL ANALYSIS OF FIBER OPTIC PROXIMITY PROBE" by Leo Hoogenboom et al, SPIE Vol. 478, Fiber Optic and Laser Sensors II (1984) and U.S. Pat. No. 4,701,610 disclose an optical sensor operating by reflection. This prior art optical sensor deduces a ratio of the luminous intensity $I_2$ of the send and receive fibres in the central part of the measuring head and the luminous intensity $I_1$ of the receive fibres disposed around the central part of the measuring head.

There are about 100 optical strands in each of these areas.

This optical sensor has the drawback of being sensitive to the coefficient of reflection of the surfaces under study.

Another drawback of this optical sensor is the overall size of the measuring head.

Another drawback of this optical sensor is that it is not directional, because of its cylindrical symmetry.

Another drawback of this optical sensor is that it cannot adequately cope with variations in the reflectivity or diffuse reflectivity of the reference surface.

This is because the areas enabling overlapping of the optical signals are small in comparison with the surfaces determining the optical signals.

In other words, the geometry of the overlap is not pure and depends on the distance between the measuring head and the reference surface.

EP-A-0 263 016 concerns a displacement and proximity sensor using three aligned optical fibres. There is one send fibre and two receive fibres that are of different kinds and have different diameters and different numerical apertures.

Because of its aligned construction and the numerical apertures chosen, in this type of sensor one receive fibre receives a great deal of energy and the other receives relatively little energy. In the field of metrology, ratios of greatly different values give poor results as compared with ratios of values in the same order of magnitude.

The energy capture surface is also large, the implication of which is that there can be statistically significant variations in the surface state across the capture surface.

Accordingly, it is necessary to calibrate the sensor for each surface to be scanned. In other words, each surface requires a curve such that the distance between the sensor and the surface is a function of the ratio of the energies picked up by the receive optical fibres.

U.S. Pat. No. 4,739,161 also concerns a displacement and proximity sensor using three aligned optical fibres. There is one send fibre and two identical receive fibres. The measuring principle is the same as that of the previous sensor but instead of receive fibres with different diameters and numerical apertures to obtain different reflected energies for each receive fibre, two identical receive fibres are used, one of which is a distance $d_0$ farther away from the surface to be scanned than the other.

This sensor has the same drawbacks as the previous one, however.

None of the above sensors has an acquisition system with dynamic characteristics matching the requirements of distance and position measurement in an operating gas turbine rotating at a speed between 3 000 rpm and 5 100 rpm at temperatures around 800° C.

One object of the invention is to provide a dynamic distance and position sensor that can make measurements on a system in operation, such as a gas turbine compressor, for example.

The dynamic distance and position sensor of the invention and the method in accordance with the invention of measuring the displacement of a surface to be scanned are also intended to solve the problem of measuring the clearance between the blade tips and the stator of a gas turbine compressor while it is operating.

The dynamic distance and position sensor of the invention and the method in accordance with the invention of measuring the displacement of a surface to be scanned are also intended to solve the problem of measuring the radial vibration characteristics of the rotor in the central part of a gas turbine compressor.

Another object of the dynamic distance and position sensor of the invention and the method in accordance with the invention of measuring the displacement of a surface to be scanned is to enable measurements on a gas turbine in operation rotating at a speed of between 3 000 rpm and 5 100 rpm.

Another object of the dynamic distance and position sensor of the invention and the method in accordance with the invention of measuring displacement in a gas turbine compressor is to enable measurements on a gas turbine in operation at a location where the temperature is in the order of 800° C.

Another object of the dynamic distance and position sensor of the invention and the method in accordance with the invention of measuring a surface to be scanned is to obtain a response that is substantially independent of the surface state of the surface to be scanned.

To this end the invention concerns a dynamic sensor for sensing the distance and the position of a surface moving past said sensor, including:

- a send optical channel emitting radiation towards the surface and two receive optical channels each receiving a portion of the radiation reflected or diffusely reflected by said surface, each optical channel having one end facing the surface, said ends forming the probe of the sensor;
- a radiation emitter coupled to the other end of the send optical channel to generate the radiation emitted towards the surface;
- an opto-electronic converter coupled to the other end of each of the two receive optical channels to convert into an electrical signal the reflected or diffusely reflected radiation received by the coupled receive optical channel;
- a processor device connected to the opto-electronic converters to process the electrical signals from said opto-electronic converters;

in accordance with the invention:

- the send optical channel and the receive optical channels respectively have a send axis and receive axes that are parallel to each other;

the ends of the optical channels facing the surface are in a common plane perpendicular to the axes of the optical channels, each of said ends constituting the vertex of a triangle in said plane, one side of the triangle running from the end of the send optical channel having a length different than the length of the other side running from the end of the send optical channel.

The optical channels have the same numerical aperture, the same diameter and the same optical characteristics.

The probe is rotatable about an axis parallel to the axes of the optical channels.

Each opto-electronic converter has a conversion rise time constant less than a specific time corresponding to a predetermined maximal frequency of distance steps.

The processor device includes, connected to the output side of each opto-electronic converter, current amplifier means for amplifying the electrical signal from the connected opto-electronic converter, said amplifier means having a bandwidth between 0 Hz and N times the predetermined maximal frequency, N corresponding to the number of the first harmonic of a signal at the predetermined maximal frequency having an amplitude less than a threshold value corresponding to a predetermined fraction of the amplitude of the distance steps.

The processor device further includes, connected to the output side of the current amplifier means, a digital acquisition card with means for simultaneously sampling amplified electrical signals from each of the current amplifier means and means for temporarily storing a measurement campaign;

permanent storage means, and processing or post-processing means, the sampling frequency being at least twice the upper limit of the bandwidth of the amplifier means.

The post-processing means include means for calculating the ratio R(t) between the simultaneously sampled digital values relating to one surface element of the surface facing the probe at time t and deducing from the ratio R(t) and a reference curve or the like the distance between the sensor and said surface element.

The post-processing means further include a three-dimensional reference table record or the like and means for deducing the reflectivity of the surface element from said table according to the distance between the sensor and the surface element from one of the sampled digital values.

The opto-electronic converters are Si semiconductor photodiodes.

The opto-electronic converters are AsGa semiconductor photodiodes.

The wavelength of the radiation emitted is substantially in the maximal spectral response area of the opto-electronic converters.

The moving surface includes blade tips of an operating gas turbine compressor, the sensor is mounted on the stator and the predetermined maximal frequency is equal to the frequency at which the blade tips move past the probe. The dynamic sensor further includes a sensor responsive to the angular position of the rotor of the compressor connected to the digital acquisition card, said digital acquisition card including means for acquiring the angular position of the rotor at time t and associating it with the simultaneously sampled digital values relating to a surface element of the surface facing the probe at time t.

The invention also concerns a method of measuring the position of a surface element of a surface moving in front of a sensor in accordance with the invention, including the following steps:

radiation is emitted towards the surface by the send optical channel;

each of the two receive optical channels receives a portion of the radiation reflected or diffusely reflected by the surface element facing the probe at time t, the receive optical channel nearer the send optical channel picking up a greater portion of the radiation than that picked up by the receive optical channel farther from the send optical channel;

each opto-electronic converter converts to an electrical signal that portion of the radiation received by the receive optical channel to which it is coupled;

each converted electrical signal is processed by the processor device.

In the processor device:

each electrical signal is amplified by the current amplifier means, then the amplified signals at the output of the current amplifier means are simultaneously sampled by the sampling means, then the simultaneously sampled digital values relating to a surface element of the surface facing the probe at time t are stored in the storage means for post-processing.

An advantage of the dynamic distance and position sensor of the invention stems from the triangular positioning of the optical channels which provides two reflected or diffusely reflected radiation lunes close together and of substantially the same order of magnitude. These features yield a single sensor calibration curve regardless of the surface state of the surface to be scanned.

Another advantage of the present invention is due to the fact that the dynamic characteristics of the sensor depend on a predetermined maximal frequency beyond which there is no need to distinguish the distance steps.

Another advantage of the dynamic sensor of the invention and the method in accordance with the invention of measuring the distance and position of a surface to be scanned is that additional information can be obtained, i.e. the reflectivity of the surface to be scanned can be measured and the machined or oxidised state of the surface deduced therefrom.

Another advantage of the dynamic distance and position sensor is that the inclination of the surface to be scanned can be deduced.

Another advantage of the dynamic distance and position sensor of the invention and the method in accordance with the invention of measuring the displacement of a surface to be scanned is that measurements can be made on hot surfaces.

Another advantage of the present invention is that the eccentricity of the axis of a rotating rotor or the vibration of the rotating rotor can be deduced.

Other objects, features and advantages of the invention will emerge from a reading of the description of the preferred embodiment of the dynamic distance and position sensor and the method of measuring the displacement of a surface to be scanned given with reference to the drawings, in which.

Figure 1:
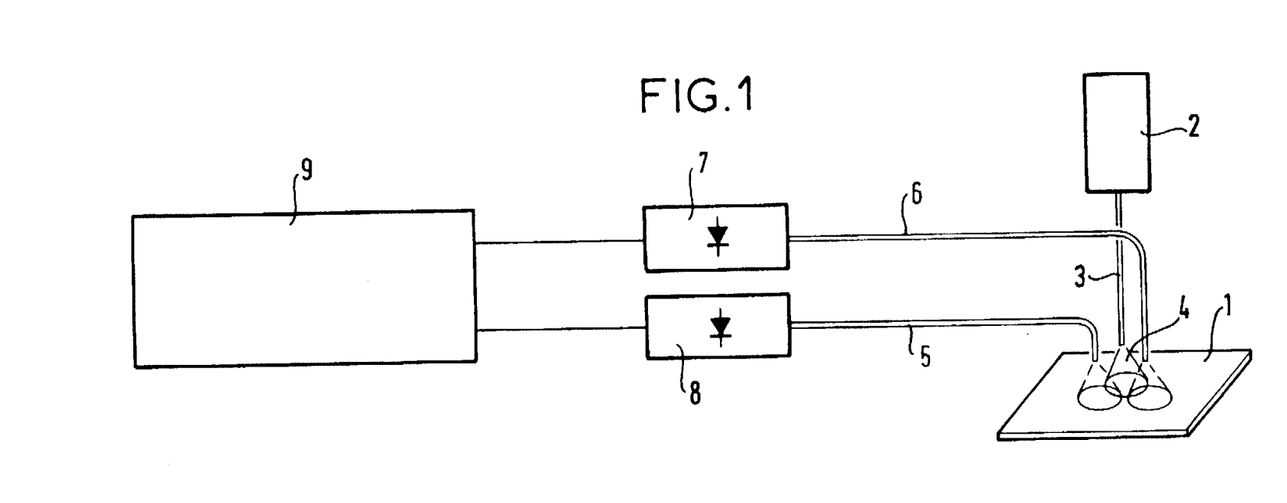
FIG. 1 shows a first embodiment of the dynamic distance and position sensor of the invention.

The dynamic sensor for sensing the distance and position of a surface 1 to be scanned includes:

- a radiation emitter 2 coupled to one end of a send optical channel 3 conveying the radiation to the surface to be scanned;
- two receive optical channels 5, 6 each having one end facing the surface 1 to be scanned, the other end being coupled to an opto-electronic converter 7, 8; and
- a processor device 9 connected to the opto-electronic converters 7, 8.

The radiation emitter 2 emits radiation 4. The emitted radiation 4 is injected into and propagates along the send optical channel 3.

In the send optical channel 3 the radiation 4 propagates towards the surface 1 to be scanned. The emitted radiation is reflected from the surface 1 to be scanned.

The receive optical channels 5, 6 collect first and second portions 4A and 4B of the radiation 4 emitted by the send optical channel 2 and then reflected or diffusely reflected by the surface 1 to be scanned.

Each opto-electronic converter 7, 8 converts into an electrical signal the portion 4A, 4B of the radiation 4 collected by the optical channel 5, 6 to which it is coupled.

The electrical signal produced by each of the opto-electronic converters is transmitted to the processor device 9.

The send and receive axes of the optical channels 3, 5, 6 are parallel to each other.

The ends of the optical channels 3, 5, 6 facing the surface 1 are in a common plane perpendicular to the axes of the optical channels 3, 5, 6. These three ends constitute the probe 10 of the sensor.

An important feature of the invention is that each end is at the vertex of a triangle in said plane.

The sides of the triangle running from the end of the send channel 3 are different lengths.

Figure 2:
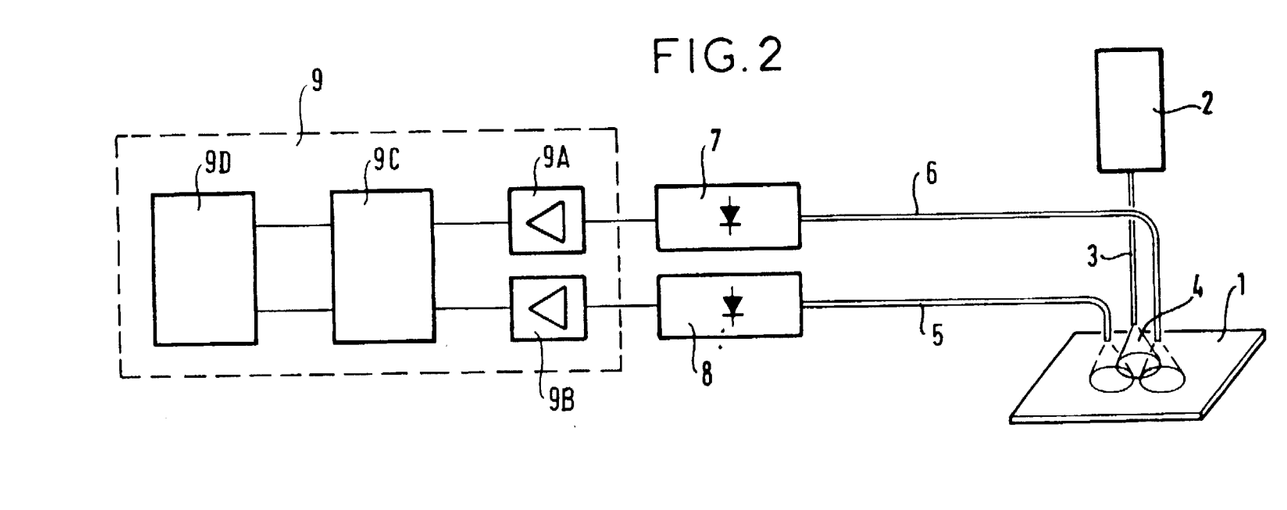
FIG. 2 shows a second embodiment of the dynamic distance and position sensor of the invention.

FIG. 2 shows a second embodiment of the dynamic sensor of the invention.

Components that reappear in this second embodiment and described with reference to FIG. 1 carry the same reference numbers.

The processor device 9 includes, connected to the output side of each opto-electronic converter 7, 8, amplifier means 9A, 9B for amplifying the electrical signal from the opto-electronic converter 7, 8 to which it is connected.

The processor device 9 further includes, connected to the output side of the amplifier means 9A, 9B, means 9C for sampling and digitising simultaneously the amplified electrical signal from the amplifier means 9A, 9B of each of the receive optical channels 5, 6 and for temporarily storing the simultaneously sampled digital values and means 9D for permanently storing the simultaneously sampled digital values and for processing or post-processing said simultaneously sampled digital values.

Figure 3:
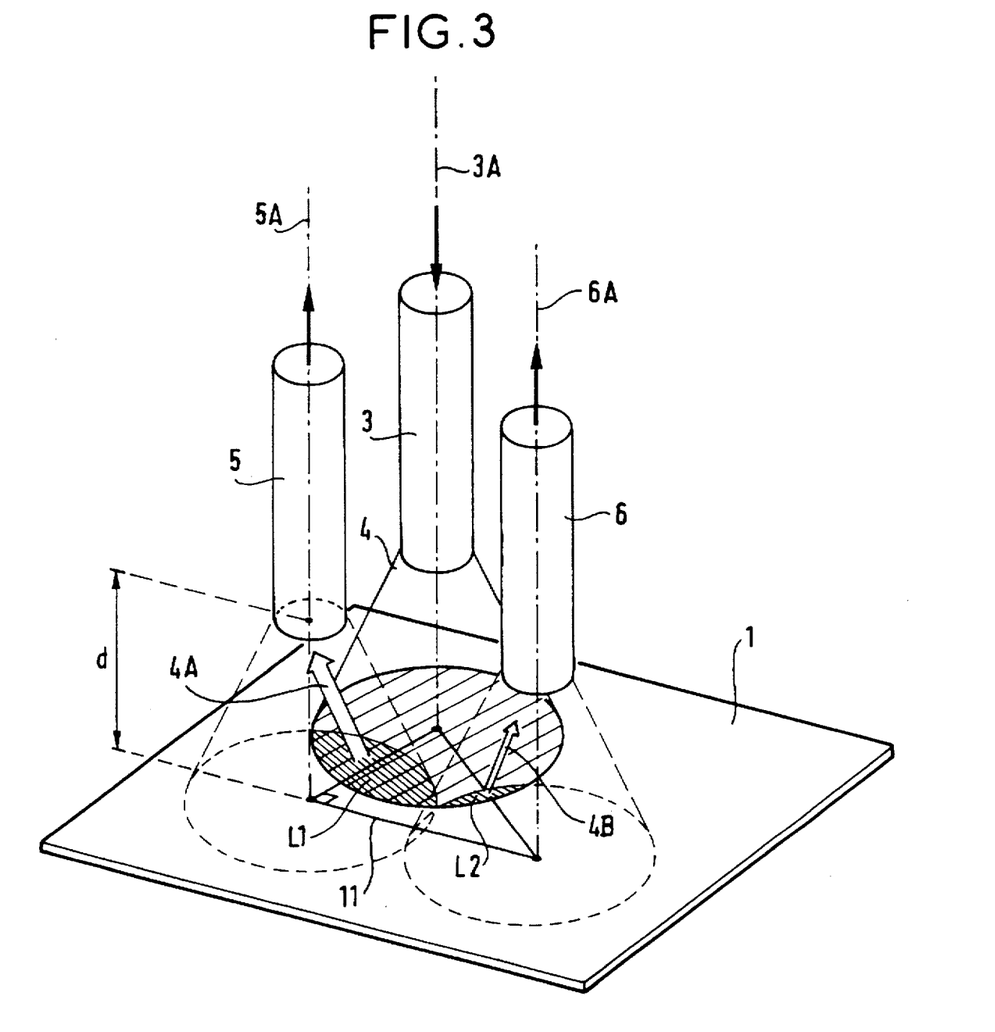
FIG. 3 shows all of the radiation on the surface to be scanned and illustrates the optical principle used by the dynamic distance and position sensor.

FIG. 3 shows the emitted radiation 4 and the portions 4A, 4B of the radiation 4 reflected or diffusely reflected by the surface 1 to be scanned.

FIG. 3 shows the send optical channel 3 for the emitted radiation 4 and the receive optical channels 5, 6 for the first and second portions 4A, 4B, respectively, of the reflected or diffusely reflected radiation 4.

The emitted radiation 4 forms a cone of radiation illuminating a surface element of the surface to be scanned. The receive optical channels 5, 6 capture the radiation in their respective capture cone. The first and second portions 4A, 4B of the reflected or diffusely reflected radiation 4 correspond to the respective lunes of intersection between the base of the radiation cone and, respectively, the base of the capture cone of the receive optical channel 5 nearer the send optical channel 3 and the base of the capture cone of the receive optical channel 6 farther from the send optical channel 3.

In a preferred embodiment the send optical channel is a send optical fibre 3 and the receive optical channels 5, 6 are receive optical fibres, the three optical fibres all having the same diameter and the same numerical aperture (the cone angle of the radiation or capture cone). The optical fibres preferably have the same characteristics, for example they are all stepped index optical fibres.

FIG. 3 also shows the optical principle used by the dynamic distance and position sensor. This principle, known in itself, establishes the ratio R of the second portion 4B of the reflected or diffusely reflected radiation 4 to the first portion 4A of the reflected or diffusely reflected radiation 4, the distance d between the probe 10 of the sensor and the surface element by which the radiation 4 was reflected or diffusely reflected being a function of this ratio R.

In the prior art, because the optical channels are not optimally disposed (they are aligned in a common plane or concentric), this function is highly dependent on the surface state of the surface to be scanned.

This is no problem in the case of fixed and accessible surfaces. In the case of moving surfaces, on the other hand, especially inaccessible moving surfaces, the various surface states of the surface to be scanned must be known very accurately and logged prior to use of the sensor so that as the surface moves past the sensor the system can determine which function to use and which surface element to use it on.

In accordance with the invention, the ratio R is between 0 and 1. The energy from the second portion 4B of the radiation captured by the receive optical channel 6 farther from the send optical channel 3 is always less than the energy from the first portion 4A captured by the receive optical channel 5 nearer the send optical channel 3.

The triangular structure of the probe 10 is one feature producing lunes L1, L2 that are close together, possibly even partly superposed one on the other; and lunes L1, L2 having different surface areas in substantially the same order of magnitude.

Figure 5:
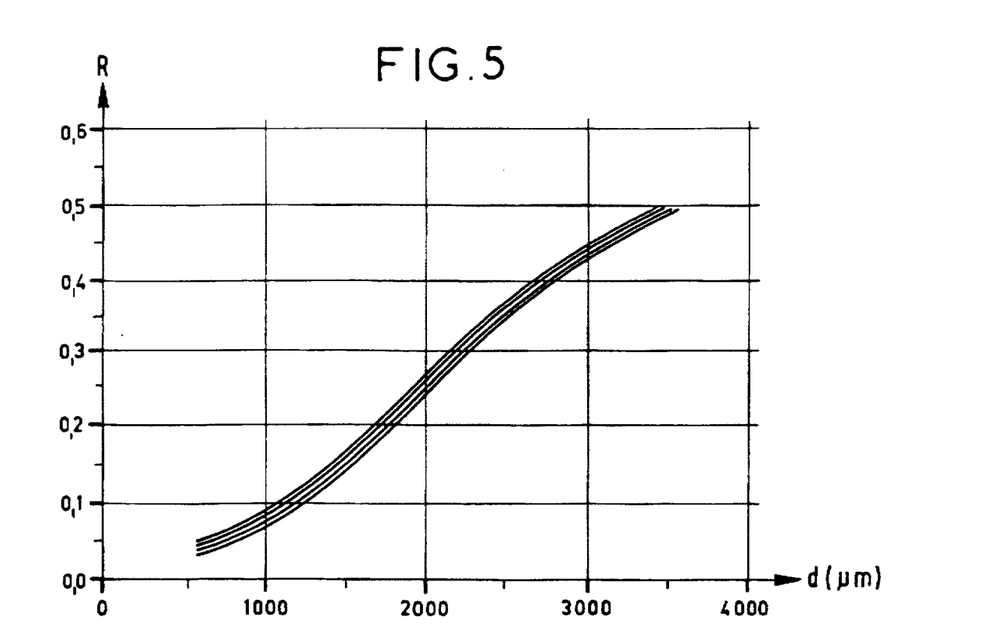
FIG. 5 is a graph showing the independence of the distance measurement from the surface state of the surface to be scanned.

The FIG. 5 graph shows, for four surface states of the surface to be scanned, the value of the ratio R between the values of the second portion 4B and the first portion 4A of the reflected or diffusely reflected radiation 4 as a function of the distance d between the probe 10 of the dynamic sensor of the invention and the surface to be scanned.

The top curve shows a surface state having a roughness $R_a$ in the order of 1.6 µm and the bottom curve shows a surface state having a roughness $R_a$ in the order of 0.05 µm.

With the sensor of the invention the distance d between the sensor probe and the surface to be scanned is substantially a function of the same polynomial interpolation in R regardless of the surface state of the surface to be scanned between 1.6 µm and 0.05 µm. The minimal distance d is in the order of one millimeter.

Figure 4:
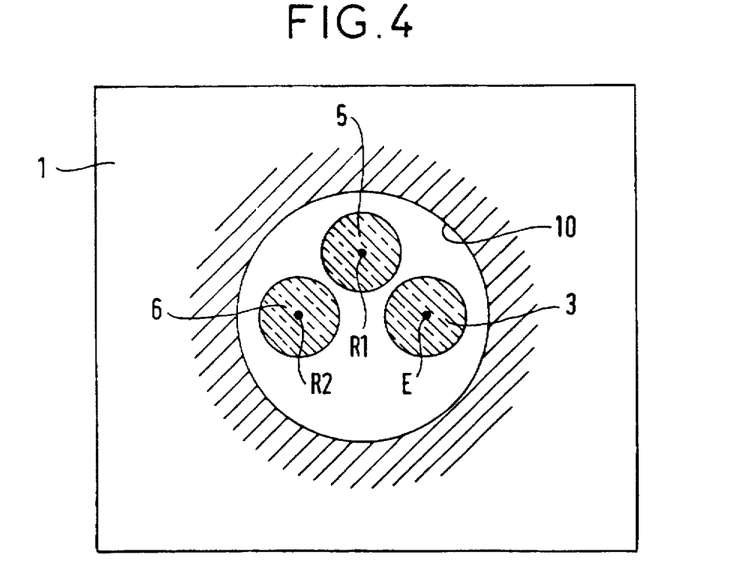
FIG. 4 shows the active end of the probe of the dynamic sensor of the invention.

As previously mentioned, the send fibre 3 and the two receive fibres 5, 6 are each at a vertex of a triangle.

This is any triangle with sides running from the send fibre 3 of unequal length.

FIG. 4 shows the active end of the probe of the dynamic sensor of the invention.

The optical fibres are at respective vertices of a triangle.

The send optical fibre 3 is at a vertex E of the triangle and the receive optical fibres 5, 6 are at respective vertices $R_1$ and $R_2$ of the triangle.

For a given fibre diameter the lengths $ER_1$ and $ER_2$ of the sides of the triangle are chosen in accordance with the working distance or the estimated order of magnitude of the distance d.

To obtain a wide-angle sensor it is preferable to increase the length of the sides of the triangle.

The proportions of the triangle are chosen to determine the sensitivity of the sensor.

The variation in the distance d is a function of the variation in the ratio R and is in direct proportion to the degree to which the side lengths $ER_1$ and $ER_2$ are similar.

Other features of the present invention result from dynamic aspects of the sensor needed for good acquisition of information when the surface to be scanned is moving past the sensor.

Each opto-electronic converter 7, 8 has a conversion rise time constant less than a specific time corresponding to a predetermined maximal frequency of captured energy steps. The energy step corresponds to a sudden variation in the distance d. This maximal frequency is the frequency beyond which the opto-electronic converters 7, 8 can no longer convert the energy step without attenuation, thereby introducing error into the ratio R and thus into the determined value of the distance d.

The opto-electronic converters 7, 8 can be silicon PIN photodiodes or AsGa photodiodes, for example.

The source or generator 2 of the radiation 4 can advantageously be a simple LED. However, for optimal operation the wavelength of the LED must be close to the maximal area of the spectral response of the opto-electronic converters 7, 8. For the photodiodes mentioned above, for example, LEDs with a wavelength of 655 nm or 850 nm can be used.

The opto-electronic converters 7, 8 can be current or photocurrent mode devices (short-circuit converters) or voltage mode devices (converters driving a load resistor).

Current mode operation is preferable, the photocurrent of the opto-electronic converter 7, 8 being directly proportional to the reflected or diffusely reflected flux of radiation 4 captured by the receive optical channel 5, 6.

The amplifier means 9A, 9B have a bandwidth between 0 Hz and N times the predetermined maximal frequency, N being the number of the first harmonic of a signal at the predetermined maximal frequency having an amplitude below a threshold value.

In the case of pulse signals, for example, N can be greater than or equal to 8.

This is necessary if the output signal from the opto-electronic converter 7, 8 is to be amplified without distortion or attenuation.

The amplifier means 9A, 9B are advantageously current amplifiers connected to the opto-electronic converters 7, 8.

The flux of radiation 4 reflected or diffusely reflected by machined surfaces is low in practice and the resulting electrical signals must therefore be strongly amplified. The gain of the amplifier means 9A, 9B is advantageously greater than or equal to $10^6$ V/A, for example.

The sampling frequency of the digital acquisition card is at least twice the upper limit of the bandwidth of the amplifier means 9A, 9B.

For signals containing high levels of high order harmonics a sampling frequency in the order of eight to 10 times the upper limit of the bandwidth of the amplifier means 9A, 9B is suitable.

The processing or post-processing means 9D of the invention include means for calculating the ratio R(t) between the simultaneously sampled digital values relating to a surface element of the surface facing the probe 10 at time t and for deducing from the ratio R(t) and the polynomial interpolation or the like the distance d between the sensor and said surface element.

After determining the distance d the reflectivity of the surface 1 to be scanned is deduced from the value of the luminous intensity of the first or second portion 4A, 4B of the radiation 4 reflected or diffusely reflected by the surface 1 to be scanned.

This is done using characteristic curves for the variation in the luminous intensity of the first and second portions 4A, 4B of the reflected or diffusely reflected radiation as a function of the distance d. Each curve represents a given surface state and the curve corresponding to the combination of the distance d and the luminous intensity of the first or second portion 4A, 4B of the reflected or diffusely reflected radiation indicates the surface state of the surface element in question.

The processing or post-processing means therefore include a reference table record or the like integrating said curves and means for deducing the reflectivity of the surface element from said table according to the distance d between the sensor and the surface element and from one of the sampled digital values.

In accordance with one feature of the invention the sensor probe is rotatable about an axis parallel to the axes of the fibres.

This feature of the probe enables a plurality of measurements to be obtained from a given surface element by pivoting the sensor probe after each measurement. Comparing the various distances d obtained from these measurements gives the slope of the surface element in question relative to the plane of the sensor probe.

The same dynamic distance and position sensor can be used to measure clearances and/or vibration on a gas turbine compressor in operation.

The dynamic distance and position sensor can be used to measure the clearance between the blade ends and the stator and/or to measure the vibration characteristics of a rotor, in particular in the central part of the machine.

Finally, the dynamic distance and position sensor can be used to measure clearances and/or vibration on gas or steam turbine stages in operation.

Figure 6:
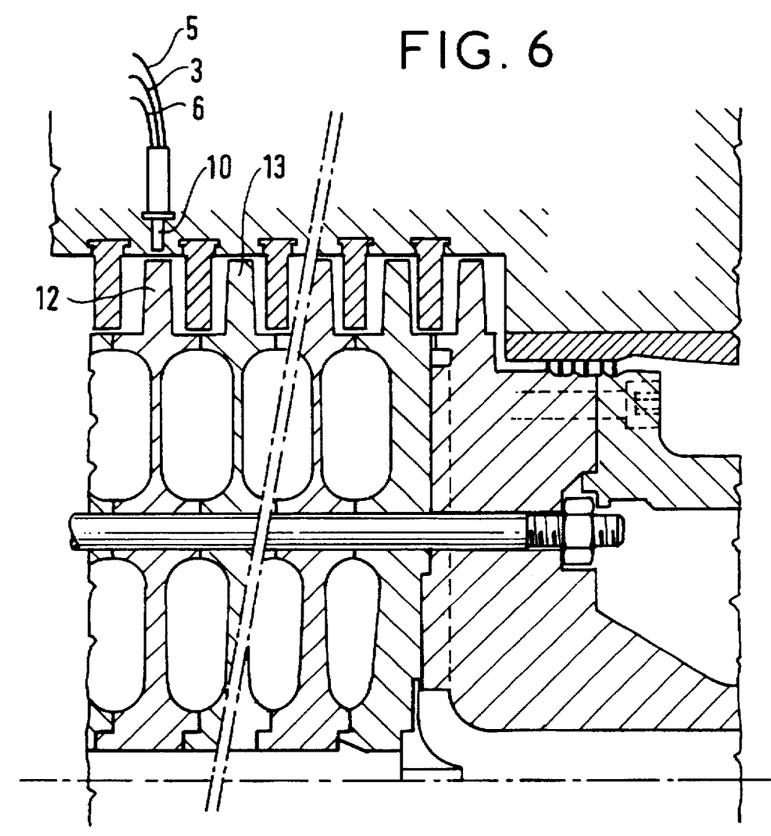
FIG. 6 shows an embodiment of the dynamic sensor of the invention for position measurements on a gas turbine compressor.

FIG. 6 shows an embodiment of the dynamic distance and position sensor of the invention for measurement of the blade tip clearance and vibration in the rotor of a gas turbine compressor.

FIG. 6 therefore shows an overall view of a gas turbine compressor rotor.

In this embodiment of the dynamic distance and position sensor, the sensor head 10 including the send optical fibre 3 and the two receive optical fibres 5, 6 faces one end of a moving blade 12.

In the case of a gas turbine compressor stage with 60 blades and a nominal rotation speed of 5 100 rpm the blade tips move past the sensor probe at a frequency of 5.1 kHz and at a temperature not exceeding 350° C.

The two signals generated by the photodiodes are therefore pulse signals. In accordance with the invention the upper limit of the bandwidth of the amplifier means must be at least N times 5.1 kHz with N=8, i.e. 40.8 kHz.

The sampling frequency of the digital acquisition card is 400 kHz which is eight to 10 times the upper limit of the bandwidth of the amplifier means. A blade tip passes the sensor in 15 μs and six or seven measurement points are therefore obtained on each blade tip.

To measure the distance d and its variation on different blade tips 12, 13 of the gas turbine compressor rotor, the measuring probe of the sensor of the invention is oriented in rotation about its axis so that the two lunes $L_1$ and $L_2$ pass in succession over the same areas 14, 15 on the blade tips.

Figure 7:
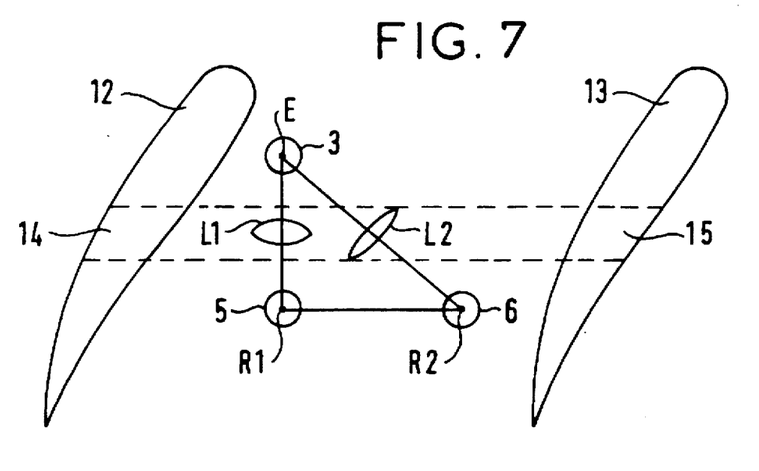
FIG. 7 shows the preferred principle of the measuring method of the invention.

FIG. 7 shows the preferred principle of the measuring method of the invention.

One advantage of this preferred principle is that it minimises the variations in the reflectivity at the blade tips because the measurements are taken on a narrow strip (less than 1 mm wide).

The shift of the signals for the first and second portions 4A, 4B of the light wave 4 on the time scale is then corrected, for example in the digital domain and using a known method (not described).

The sensor further includes a turn pulse generator (not shown) so that each measurement is referenced to an angular reference mark.

The measurement campaign is conducted over around 15 revolutions after which the distance time profiles obtained are averaged and the Fourier transform of the time profile is calculated. The eccentricity of the rotor axis and/or vibration at the rotor axis can be deduced from this transform.

This example has been given by way of illustration only and is in no way limiting on applications of the sensor of the invention.

In applications at lower temperatures, for example temperatures below 85° C., polymer (PMMA) optical fibres can be used. An advantage of this solution is that it reduces the cost of the sensor of the invention.

I claim:

1. Dynamic sensor for sensing a distance between a probe of the sensor and a surface moving past the sensor, said dynamic sensor consisting of:
    a send optical channel having a first end facing the surface moving past the sensor and a second end coupled to a radiation emitter, said radiation emitter emitting radiation towards the surface through said first end of said send optical channel, the surface reflecting or diffusing said emitted radiation;
    two receive optical channels, each of said two receive optical channels having a first end facing the surface and a second end coupled to respective opto-electronic converters, each of said two receive optical channels receiving a portion of the reflected or diffused radiation, said first end of said send optical channel and said first ends of said two receive optical channels together forming the probe of the sensor, said opto-electronic converters converting said portion of the reflected or diffused radiation received by the coupled receive optical channel, into an electrical signal; and
    a processing device connected to said opto-electronic converters for processing said electrical signals output from said opto-electronic converters, wherein
    said send optical channel and said receive optical channels have, respectively, a send axis and receive axes parallel to each other, and wherein
    said first end of said send optical channel and said first ends of said receive optical channels are located in a common plane perpendicular to the send and receive axes, respectively, of the send and receive optical channels, each of said first ends constituting the vertex of a triangle contained in said plane, one side of said triangle running from said first end of said send optical channel having a length different than the length of the other side running from said first end of said send optical channel.

2. Sensor according to claim 1 wherein said send and receive optical channels are optical fibers and have the same numerical aperture, diameter and optical properties.

3. Sensor according to claim 1 wherein said probe is rotatable around an axis parallel to said axes of said optical channels.

4. Sensor according to claim 1 wherein said opto-electronic converters comprise Si semiconductor photodiodes.

5. Sensor according to claim 1 wherein said opto-electronic converters comprise AsGa semiconductor photodiodes.

6. Sensor according to claim 1 wherein the wavelength of the emitted radiation is substantially located in a maximal spectral response area of said opto-electronic converters.

7. Sensor according to claim 1 wherein said moving surface comprises blade tips of an operating gas turbine compressor, said probe is mounted on a stator of said gas turbine, and the predetermined maximal frequency is equal to a frequency at which said blade tips move past said probe.

8. Sensor according to claim 7 comprising a sensor responsive to an angular position of a rotor of the compressor and connected to a digital acquisition board, said digital acquisition board comprising means for acquiring angular position of the rotor at time t, and said processing device comprising means for associating the angular position with simultaneously sampled digital values relating to a surface element of the surface, facing the probe at time t.

9. Sensor according to claim 1 wherein each opto-electronic converter has a conversion rise time constant less than a specific time corresponding to a predetermined maximal frequency of distance steps.

10. Sensor according to claim 9 wherein said processing device comprises, connected to each of said opto-electronic converters, current amplifier means for amplifying said electrical signals output from said connected opto-electronic converters, said amplifier means having a bandwidth between 0 Hz and N times the predetermined maximal frequency, N corresponding to the number of the first harmonic of a signal at the predetermined maximal frequency, which signal has an amplitude less than a threshold value corresponding to a predetermined fraction of the amplitude of said distance steps.

11. Sensor according to claim 10 wherein said processing device further comprises, connected to said current amplifier means, a digital acquisition board with means for simultaneously sampling amplified electrical signals output from each of said current amplifier means and means for temporarily storing a measurement campaign; and
    means for permanent storage and for processing or post-processing said simultaneously sampled digital values, the sampling frequency of said digital acquisition board being at least twice the upper limit of said bandwidth of said amplifier means.

12. Sensor according to claim 11 wherein said processing or post-processing means comprise means for calculating a ratio R(t) between said simultaneously sampled digital values relating to one surface element of the surface facing the probe at time t and deducing from the ratio R(t) and a reference curve the distance between said probe and the surface element, regardless of a surface state of the surface element.

13. Sensor according to claim 12 wherein said processing or post-processing means comprises a three-dimensional reference table record and means for deducing reflectivity of the surface element from said table record according to the distance between said probe and the surface element, and one of said simultaneously sampled digital values of the surface element.

14. Method for measuring the position of a surface element of a surface moving past a sensor, the sensor having a send optical channel having a first end facing the surface and a second end coupled to a radiation emitter, the radiation emitter emitting radiation towards the surface through the first end of the send optical channel, the surface reflecting or diffusing the emitted radiation, two receive optical channels, each of the two receive optical channels having a first end facing the surface and a second end coupled to respective opto-electronic converters, each of the two receive optical channels receiving a portion of the reflected or diffused radiation, the first end of the send optical channel and the first ends of the two receive optical channels forming together the probe of the sensor, the opto-electronic converters converting the portion of the reflected or diffused radiation received by the coupled receive optical channel, into an electrical signal, a processing device connected to the opto-electronic converters to process the electrical signals output from the opto-electronic converters, the send optical channel and the receive optical channels having respectively a send axis and receive axes parallel to each other, the first end of the send optical channel and the first ends of the receive optical channels being located in a common plane perpendicular to the send or receive axes of, respectively, the send or receive optical channels, each of the first ends constituting the vertex of a triangle contained in the plane, one side of the triangle running from the first end of the send optical channel having a length different than the length of the other side running from the first end of the send optical channel, said method comprising steps of:

emitting radiation towards the surface by the send optical channel;

receiving, at each of the two receive optical channels, a portion of the radiation reflected or diffused by the surface element facing the probe at time t, the receive optical channel nearer the send optical channel picking up a greater portion of the radiation than the portion picked up by the receive optical channel farther from the send optical channel;

converting to an electrical signal, at each of the opto-electronic converters, the portion of the radiation received by the receive optical channel to which the opto-electronic converters are coupled; and processing each converted electrical signal by the processing device.

15. Method according to claim 14 wherein, in the processing device, said method further comprises steps of:

amplifying, by a current amplifier means, each electrical signal;

simultaneously sampling and temporarily storing, by a sampling means, the amplified signals; and permanently storing the simultaneously sampled amplified signals relating to a surface element of the surface facing the probe at time t in a permanent storage and processing or post-processing means for processing or post processing.

* * * * *